(12) United States Patent  
Katagiri et al.

(10) Patent No.: US 7,597,781 B2
(45) Date of Patent: Oct. 6, 2009

(54) INORGANIC FIBER PAPER

(75) Inventors: Yuji Katagiri, Tokyo (JP); Shoji Sugiyama, Tokyo (JP); Yoshinobu Kakizaki, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 217 days.

(21) Appl. No.: 11/791,506

(22) PCT Filed: Nov. 22, 2005

(86) PCT No.: PCT/JP2005/021439

§ 371 (c)(1),
(2), (4) Date: May 24, 2007

(87) PCT Pub. No.: WO2006/057240

PCT Pub. Date: Jun. 1, 2006

(65) Prior Publication Data

US 2007/0292673 A1 Dec. 20, 2007

(30) Foreign Application Priority Data

Nov. 24, 2004 (JP) .............................. 2004-339648

(51) Int. Cl.
*D21H 11/00* (2006.01)
(52) U.S. Cl. .................... 162/181.6; 428/219; 429/247; 429/66
(58) Field of Classification Search .............. 162/181.6; 428/219; 429/247, 66
See application file for complete search history.

(56) References Cited

U.S. PATENT DOCUMENTS 4,885,058 A 12/1989 Hani et al. ................... 162/145

FOREIGN PATENT DOCUMENTS

| JP | 59-71255 | 4/1984 |
| JP | 60-58221 | 4/1985 |
| JP | 60-81399 | 5/1985 |
| JP | 60-119073 | 6/1985 |
| JP | 62-207780 | 9/1987 |
| JP | 2-251214 | 10/1990 |
| JP | 5-311596 | 11/1993 |
| JP | 9-71768 | 3/1997 |
| JP | 9-87992 | 3/1997 |
| JP | 10-317298 | 12/1998 |
| JP | 2000-86887 | 3/2000 |
| JP | 2001-163613 | 6/2001 |
| JP | 2003-55888 | 2/2003 |

*Primary Examiner*—Mark Halpern
(74) *Attorney, Agent, or Firm*—Kratz, Quintos & Hanson, LLP

(57) ABSTRACT

This invention provides an inorganic fiber paper that consists essentially of inorganic materials and has a basis weight of less than 100 g/m$^2$ and has been mainly produced by a wet sheet making method. The inorganic fiber paper comprises inorganic fibers and an inorganic binder as materials, wherein the inorganic fibers have been bound to each other with the inorganic binder. In the inorganic fiber paper, the content of impurities during wet sheet making is low, the water resistance and flexibility are good, and satisfactory strength and high porosity can be realized. The inorganic fiber paper is produced from a material comprising 60 to 97% by mass of inorganic fibers having an average fiber diameter of not more than 5 μm and 3 to 40% by mass of an inorganic binder composed mainly of a silica-based flaky inorganic material that has a hydroxyl group content per specific surface area of not less than 20 μmol/m$^2$ as measured by a BET method, an average particle diameter of not more than 2 μm as measured by a laser scattering method and an aspect ratio of not less than 10.

9 Claims, No Drawings

INORGANIC FIBER PAPER

This application is a 371 of PCT/JP05/21439 filed on 22 Nov. 2005.

TECHNICAL FIELD

The present invention relates to an inorganic fiber paper that consists substantially of only inorganic materials, and is usable as heat-insulating sheet materials, heat-resistant sheet materials, insulation sheet materials, filter sheet materials, buffer sheet materials, reinforcing sheet materials, etc. The inorganic fiber paper is produced mainly by a wet sheet making method, and comprises inorganic fibers and an inorganic binder as materials, wherein the inorganic fibers are bound to each other with the inorganic binder.

BACKGROUND ART

In case of an inorganic fiber paper produced by wet paper making, a predetermined strength may be imparted to an inorganic fiber paper having a high basis weight of not less than 100 g/m$^2$ by using fine diameter fibers, for example, having an average fiber diameter of not more than 1 μm as the inorganic fibers, owing to the entanglement of the fine diameter inorganic fibers therein; and therefore, an inorganic fiber paper may be obtained from materials of only inorganic fibers, not using a binder (for example, Patent References 1 and 2). However, for an inorganic fiber paper having a low basis weight of less than 100 g/m$^2$, even though fine diameter inorganic fibers, for example, having an average fiber diameter of not more than 1 μm are used similarly, the paper could hardly have a satisfactory paper strength only by the entanglement of the fine diameter inorganic fibers therein; and even when any auxiliary strength-enhancing measure of using thick fibers and thin fibers as mixed for the inorganic fibers is employed, use of a binder is inevitable.

Heretofore, the binder usable in an inorganic fiber paper having such a low basis weight of less than 100 g/m$^2$ includes an organic fibers such as a synthetic resin emulsion, a thermofusible synthetic fibers, micro-fibrillated organic fibers, and an inorganic binder such as an inorganic oxide sol; and it may be used by internal addition (pre-addition to a sheet making stock material) or external addition (post-addition to sheet after wet sheet making) (for example, Patent References 3 to 8).

However, in case where an organic binder is used as the binder, there may occur problems during use of the inorganic fiber paper, in that the organic binder may undergo oxidation-reduction decomposition owing to the influence of chemical substances or voltage thereon, or may be decomposed or fired by heat, or may generate a volatile gas or may form a side product owing to such decomposition or firing. For example, in case where an inorganic fiber paper is used at a temperature of from 200 to 600° C., the organic binder therein is not completely fibered but remains therein with forming a small amount of a side product. In case where an organic binder containing carbon, oxygen and hydrogen is used, it may generate an organic substance such as aldehyde, ketone and carboxylic acid in incomplete combustion. In case where an organic binder further containing nitrogen in addition to carbon, oxygen and hydrogen is used, it may generate a smelling nitrogen compound such as amine compound and nitrile compound in incomplete combustion.

In case where an inorganic binder such as an inorganic oxide sol (inorganic oxide sol-based inorganic binder) is used as the binder and when the inorganic oxide sol-based inorganic binder is added as internal addition during wet sheet making, there is a problem in that the retention yield of the inorganic oxide sol-based inorganic binder during sheet making is low and therefore a large amount of the inorganic oxide sol-based inorganic binder must be used; and when the inorganic oxide sol-based inorganic binder is added as external addition, there is a problem in that it lowers the flexibility of the inorganic fiber paper and lowers the producibility, thereby increasing the production cost.

Accordingly, as a method of using an inorganic binder except the inorganic oxide sol-based inorganic binder, Example 8 in Patent Reference 9 proposes an inorganic fiber paper having a basis weight of 100 g/m$^2$ and produced from a material comprised of 85% by mass of micro-glass fibers (average fiber diameter, about 2.7 μm) and, as an inorganic binder, 15% by mass of synthetic swelling fluoromica (average fiber diameter, about 6 μm), by wet sheet making.

Patent Reference 1: JP-A 59-71255
Patent Reference 2: JP-A 60-119073
Patent Reference 3: JP-A 10-317298
Patent Reference 4: JP-A 60-81399
Patent Reference 5: JP-A 62-207780
Patent Reference 6: JP-A 60-58221
Patent Reference 7: JP-A 5-311596
Patent Reference 8: JP-A 2-251214
Patent Reference 9: JP-A 9-87992

DISCLOSURE OF THE INVENTION

Problems that the Invention is to Solve

However, the inorganic fiber paper of Patent Reference 9 uses mica as an inorganic binder, but according to the paper making method where the material is dispersed in water by intercalation of the swelling mica, there is a problem of easy adsorption and intake of impurities (coagulant, impurities in sheet-making water, etc.). In addition, in the synthetic fluoromica, the hydroxyl group in natural mica is substituted with fluorine, thereby improving its heat resistance of from originally 700° C. or so up to 1000° C. or so; but owing to the substitution with fluorine, the self-adhesiveness of the mica itself is lowered, and in case where an inorganic fiber paper having a low basis weight of less than 100 g/m$^2$ is obtained, it may hardly have a satisfactory paper strength. In case of natural mica, those having an average particle diameter of not more than 3 μm are difficult to obtain. In addition, mica has poor water resistance, and when used in an environment with much moisture, it may readily cause deterioration of the property of the inorganic fiber paper; and in case where an inorganic fiber paper is obtained according to a wet sheet making method, use of mica is unsuitable.

In consideration of such conventional problems, the invention is to provide an inorganic fiber paper that consists substantially of only inorganic materials and has a basis weight of less than 100 g/m$^2$ and is produced mainly by a wet sheet making method. The inorganic fiber paper comprises inorganic fibers and an inorganic binder as materials, wherein the inorganic fibers are bound to each other with the inorganic binder. In the inorganic fiber paper, the content of impurities during wet sheet making is low, the water resistance and flexibility are good, and satisfactory strength and high porosity can be realized.

Means for Solving the Problems

To attain the above-mentioned object, the inorganic fiber paper is produced from a material comprising 60 to 97% by mass of inorganic fibers having an average fiber diameter of not more than 5 μm and 3 to 40% by mass of an inorganic binder formed mainly of a silica-based flaky inorganic material that has a hydroxyl group content per specific surface area of not less than 20 $\mu$mol/m$^2$ as measured by a BET method, an average particle diameter of which is not more than 2 $\mu$m as measured by a laser scattering method and an aspect ratio of which is not less than 10, the inorganic fibers are bound to each other with the inorganic binder and the inorganic fiber paper consists substantially of only inorganic materials and has a basis weight of less than 100 g/m$^2$, as stated in embodiment 1.

The inorganic fiber paper of embodiment 2 is the inorganic fiber paper stated in embodiment 1, which is characterized in that it is produced from a material comprising 75 to 97% by mass of the inorganic fibers and 3 to 25% by mass of the inorganic binder formed mainly of the silica-based flaky inorganic material.

The inorganic fiber paper of embodiment 3 is the inorganic fiber paper stated in embodiment 1, which is characterized in that the inorganic fibers are inorganic fibers having an average fiber diameter of not more than 1.5 $\mu$m.

The inorganic fiber paper of embodiment 4 is the inorganic fiber paper stated in embodiment 1, which is characterized in that the silica-based flaky inorganic material is flaky silica.

The inorganic fiber paper of embodiment 5 is the inorganic fiber paper stated in embodiment 1, which is characterized by having a basis weight of not more than 60 g/m$^2$.

The separator for electric energy storage devices of the invention is characterized comprising of the inorganic fiber paper of embodiment 1, as stated in embodiment 6.

The electric energy storage device of the invention is characterized by comprising the separator for electric energy storage devices of embodiment 6, as stated in embodiment 7.

The separator for electric double layer capacitors of the invention is characterized by comprising of the inorganic fiber paper of embodiment 1, as stated in embodiment 8.

The electric double layer capacitor of the invention is characterized by comprising the separator for electric double layer capacitors of embodiment 8, as stated in embodiment 9.

Effect of the Invention

According to the invention, there is provided an inorganic fiber paper that consists substantially of only inorganic materials and has a basis weight of less than 100 g/m$^2$, and is produced mainly by a wet sheet making method. The inorganic fiber paper comprises inorganic fibers and an inorganic binder as materials, wherein the inorganic fibers are bound to each other with the inorganic binder. In this, 60 to 97% by mass of fine diameter inorganic fibers having an average fiber diameter of not more than 5 $\mu$m are used as the inorganic fibers; and 3 to 40% by mass of an inorganic binder formed mainly of a silica-based flaky inorganic material that has a hydroxyl group content per specific surface area of not less than 20 $\mu$mol/m$^2$ as measured by a BET method, therefore having many hydroxyl groups in the surface thereof, and has an average particle diameter of not more than 2 $\mu$m as measured by a laser scattering method and an aspect ratio of not less than 10, and is excellent in self-adhesiveness, is used as the binder. Accordingly, owing to the synergistic effect of the entanglement effect of the fine diameter inorganic fibers and the binder effect of the inorganic binder, the inorganic fiber paper has a high mechanical strength within a temperature range of from room temperature to 600° C. or higher even though it has a low basis weight of less than 100 g/m$^2$, further not more than 60 g/m$^2$. In addition, the inorganic fiber paper solves the disadvantages of conventional inorganic fiber papers that comprise an inorganic binder such as inorganic oxide sol or swelling mica; the content of impurities during wet sheet making is low; and the water resistance and the flexibility of the inorganic fiber paper are good. Owing to the synergistic effect of the entanglement effect of the fine diameter inorganic fibers and the binder effect of the inorganic binder, the inorganic fiber paper has a satisfactory mechanical strength even though it has a low basis weight of less than 100 g/m$^2$, further not more than 60 g/m$^2$. In addition, since the inorganic fiber paper is composed of only inorganic materials, its electrolytic solution wettability, electrolytic solution retentiveness and electrolytic solution permeability are good; and therefore it is suitable to separators for electric energy storage devices such as batteries of charging and discharging by utilizing electrochemical reaction or capacitors of charging and discharging by utilizing a dielectric phenomenon. In particular, the inorganic fiber paper has excellent heat resistance, not shrinking, deforming and breaking even at high temperatures of 300° C. or so, and it may improve the drying efficiency and the dewatering efficiency during water removal from capacitors; and further, it is applicable to solderable coin-shaped capacitors, and is suitable for separators for electric double layer capacitors having high chemical durability, neither generating decomposition products and nor producing a factor of deteriorating the capacitor performance.

BEST MODE FOR CARRYING OUT THE INVENTION

The inorganic fiber paper of the invention is produced from a material comprising 60 to 97% by mass of inorganic fibers having an average fiber diameter of not more than 5 $\mu$m and 3 to 40% by mass of an inorganic binder comprised mainly of a silica-based flaky inorganic material that has a hydroxyl group content per specific surface area of not less than 20 $\mu$mol/m$^2$ as measured by a BET method, an average particle diameter of not more than 2 $\mu$m as measured by a laser scattering method and an aspect ratio of not less than 10, in which the inorganic fibers are bound to each other with the inorganic binder; and the inorganic fiber paper consists substantially of only inorganic materials and has a basis weight of less than 100 g/m$^2$.

The inorganic fiber paper of the invention has, as the base thereof, an entanglement structure of the above-mentioned inorganic fibers, and is so constituted that the inorganic fibers are bound to each other with the inorganic binder; and this realizes its paper strength owing to the fiber entanglement effect resulting from the use of fine diameter fibers having an average fiber diameter of not more than 5 $\mu$m as the inorganic fibers that form the paper skeleton, and to the binder effect of the inorganic binder characterized as above.

The inorganic fibers having an average fiber diameter of not more than 5 $\mu$m to be used in the inorganic fiber paper of the invention may be one or more types selected from industrially-available inorganic fibers, for example, artificial amorphous fibers such as glass fibers, silica fibers, alumina fibers, silica-alumina fibers, rock wool and slag wool, and acicular crystalline fibers, such as potassium titanate whiskers and calcium carbonate whiskers. Concretely, suitable inorganic fibers are properly selected and used in accordance with the use and the desired functions and characteristics of the inorganic fiber paper.

For the inorganic fibers, two or more different types of inorganic fiber materials each having a different average fiber diameter may be mixed and used so far as the average fiber diameter of all the inorganic fibers used in the inorganic fiber paper may fall within the defined range. With that, the inorganic fiber paper may be tougher, and as compared with single use of inorganic fibers having the same average fiber diameter, the paper density may increase and the paper strength may increase though the porosity may lower.

The inorganic fibers, when having an average fiber diameter of not more than 1.5 μm, are preferred, since the inorganic fiber paper may readily get it strength not requiring much binder even though the basis weight of the inorganic fiber paper is reduced.

As so mentioned hereinabove, the binder for use in the inorganic fiber paper of the invention is an inorganic binder formed mainly of a silica-based flaky inorganic material that has a hydroxyl group content per specific surface area of not less than 20 μmol/m$^2$ as measured by a BET method, therefore having many hydroxyl groups in its surface, and has an average particle diameter of not more than 2 μm as measured by a laser scattering method and an aspect ratio of not less than 10.

Using the inorganic binder that is composed mainly of the silica-based flaky inorganic material characterized as above has made it possible to obtain the inorganic fiber paper in which the content of impurities during wet sheet making is low and which has good water resistance and flexibility, satisfactory strength and high porosity.

The aspect ratio means a ratio of the maximum length to the thickness of the silica-based flaky inorganic material.

The silica-based flaky inorganic material having the characteristics as above includes flaky silica, flaky silica-titania, etc. Use of flaky silica is preferred since those having few impurities, having many hydroxyl groups in its surface and having an average particle diameter of not more than 2 μm are available through industrial production.

Any other inorganic binder may be used along with the silica-based flaky inorganic material as the inorganic binder for use herein, and it includes cakable mineral fine fibers such as sepiolite, attapulgite; cakable clay minerals such as kaolin, clay; and gels formed from silica sol, alumina sol, titania sol, zirconia sol, etc. However, in case where the mineral fine fibers or clay minerals are used, they may contain some and not a few impurities as they are natural materials; and therefore, it is desirable that their use is limited to only an extremely small amount thereof, not more than about 5% by mass (in the total formulation of the inorganic fiber paper), as an auxiliary material. Regarding the gel materials, in case where it is used too much, there may occur an inconvenience in that the flexibility of the inorganic fiber paper may lower and it could not be wound up into a roll. Accordingly, it is desirable that its use is limited to only an extremely small amount thereof, not more than about 5% by mass (in the total formulation of the inorganic fiber paper), as an auxiliary material.

As so mentioned hereinabove, the inorganic fiber paper of the invention is produced from a material comprising 60 to 97% by mass of the above-mentioned inorganic fibers and 3 to 40% by mass of an inorganic binder formed mainly of the above-mentioned silica-based flaky inorganic material. When the added amount of the inorganic binder formed mainly of the silica-based flaky inorganic material is more than 40% by mass, then it is unfavorable since water drainage in wet sheet making is poor (water filtration is high) and sheet making is difficult. Accordingly, the added amount of the inorganic binder is more preferably not more than 25% by mass. When the added amount of the inorganic binder is too large, then the added amount of the inorganic fibers to form the skeleton of the inorganic fiber paper is to be too small, and it is undesirable since the strength of the inorganic fiber paper could be hardly realized. Accordingly, the added amount of the inorganic fibers is more preferably not less than 75% by mass. When the added amount of the inorganic binder is less than 3% by mass, then it is unfavorable since the inorganic binder could hardly exhibit its binder effect and the strength of the inorganic fiber paper is not enough.

As so mentioned hereinabove, the inorganic binder is merely an auxiliary material to be added thereto for the purpose of imparting a mechanical strength to the inorganic fiber paper that is naturally an entangled structure of inorganic fibers, and therefore its minimum amount within a range within which it may impart the desired strength to the inorganic fiber paper, may be added. The actual amount of the inorganic binder to be added may be suitably determined within a range of from 3 to 40% by mass depending on the conditions such as the average fiber diameter of the inorganic fibers used and the type of the inorganic binder material. As so mentioned hereinabove, the strength of the inorganic fiber paper of the invention is obtained by the synergistic effect of the entanglement effect of the inorganic fibers and the binder effect of the inorganic binder; and therefore, when the average fiber diameter of the inorganic fibers is smaller, then the amount of the inorganic binder to be added may be smaller.

EXAMPLE 1

Next, Examples of the invention are described in detail along with Comparative Examples.

Example 1

As inorganic fibers, 80% by mass of C-glass wool fibers having an average fiber diameter of 0.6 μm (Nippon Sheet Glass' CMLF306), and as an inorganic binder, 20% by mass of flaky silica having an average particle diameter of 0.5 μm (by a laser scattering method) (Dohkai Chemical Industry's Sunlovely LFS HN-050; having a hydroxyl group content per specific surface area of from 20 to 70 μmol/m$^2$ as measured by a BET method, and having an aspect ratio of from 10 to 200) were dispersed and mixed in water, and further a polymer coagulant was added thereto. Using a square sheeting machine for hand sheet making, this was sheeted in wet and dried at 150° C. to obtain an inorganic fiber paper having a basis weight of 29.6 g/m$^2$ and a thickness of 0.21 mm.

Example 2

As inorganic fibers, 80% by mass of C-glass wool fibers having an average fiber diameter of 0.6 μm (Nippon Sheet Glass' CMLF306), and as an inorganic binder, 20% by mass of flaky silica having an average particle diameter of 1.5 μm (measured by a laser scattering method) (Dohkai Chemical Industry's Sunlovely LFS HN-150; having a hydroxyl group content per specific surface area of from 20 to 70 μmol/m$^2$ as measured by a BET method, and having an aspect ratio of from 10 to 200) were dispersed and mixed in water, and further a polymer coagulant was added thereto. Using a square sheeting machine for hand sheet making, this was sheeted in wet and dried at 150° C. to obtain an inorganic fiber paper having a basis weight of 27.8 g/m$^2$ and a thickness of 0.20 mm.

Example 3

As inorganic fibers, 75% by mass of C-glass wool fibers having an average fiber diameter of 0.6 μm (Nippon Sheet Glass' CMLF306) and 10% by mass of C-glass wool fibers having an average fiber diameter of 1.2 μm (Nippon Sheet Glass' CMLF212), and as an inorganic binder, 15% by mass of flaky silica having an average particle diameter of 0.5 μm used in Example 1 were dispersed and mixed in water, and further a polymer coagulant was added thereto. Using a square sheeting machine for hand sheet making, this was sheeted in wet and dried at 150° C. to obtain an inorganic fiber paper having a basis weight of 35.2 g/m$^2$ and a thickness of 0.22 mm.

Example 4

As inorganic fibers, 80% by mass of C-glass wool fibers having an average fiber diameter of 0.6 μm (Nippon Sheet Glass' CMLF306), and as an inorganic binder, 20% by mass of flaky silica having an average particle diameter of 0.5 μm used in Example 1, and also as an inorganic binder, external 2% by mass, based on 100% by mass of the total amount of the above materials, of silica sol were dispersed and mixed in water, and further a polymer coagulant was added thereto. Using a square sheeting machine for hand sheet making, this was sheeted in wet and dried at 150° C. to obtain an inorganic fiber paper having a basis weight of 30.9 g/m$^2$ and a thickness of 0.21 mm.

Comparative Example 1

As inorganic fibers, 80% by mass of C-glass wool fibers having an average fiber diameter of 0.6 μm (Nippon Sheet Glass' CMLF306), and as an inorganic binder, 20% by mass of flaky silica having an average particle diameter of 0.5 μm used in Example 1, and as an organic binder, external 2% by mass, based on 100% by mass of the total amount of the above materials, of acrylic resin emulsion were dispersed and mixed in water, and further a polymer coagulant was added thereto. Using a square sheeting machine for hand sheet making, this was sheeted in wet and dried at 150° C. to obtain an inorganic fiber paper having a basis weight of 29.6 g/m$^2$ and a thickness of 0.20 mm.

Comparative Example 2

As inorganic fibers, 80% by mass of C-glass wool fibers having an average fiber diameter of 0.6 μm (Nippon Sheet Glass' CMLF306), and as an inorganic binder, 20% by mass of swelling synthetic fluoromica having an average particle diameter of 5 μm (measured by a laser scattering method) (CO-OP Chemical's Somashif ME-100; having a hydroxyl group content per specific surface area of less than 20 μmol/m$^2$ as measured by a BET method, and having an aspect ratio of from 20 to 40) were dispersed and mixed in water, and further a polymer coagulant was added thereto. Using a square sheeting machine for hand sheet making, this was sheeted in wet and dried at 150° C. to obtain an inorganic fiber paper having a basis weight of 35.8 g/m$^2$ and a thickness of 0.20 mm.

Comparative Example 3

As inorganic fibers, 80% by mass of C-glass wool fibers having an average fiber diameter of 0.6 μm (Nippon Sheet Glass' CMLF306), and as an inorganic binder, 20% by mass of non-swelling synthetic fluoromica having an average particle diameter of 3 μm (measured by a laser scattering method) (CO-OP Chemical's Micromica MK-100; having a hydroxyl group content per specific surface area of less than 20 μmol/m$^2$ as measured by a BET method, and having an aspect ratio of from 20 to 40) were dispersed and mixed in water, and further a polymer coagulant was added thereto. Using a square sheeting machine for hand sheet making, this was sheeted in wet and dried at 150° C. to obtain an inorganic fiber paper having a basis weight of 41.2 g/m$^2$ and a thickness of 0.21 mm.

Comparative Example 4

As inorganic fibers, 80% by mass of C-glass wool fibers having an average fiber diameter of 0.6 μm (Nippon Sheet Glass' CMLF306), and as an inorganic binder, 20% by mass of glass flakes having an average particle diameter of 40 μm (measured by a laser scattering method) (Nippon Sheet Glass' GF2040; having a hydroxyl group content per specific surface area of less than 20 μmol/m$^2$ as measured by a BET method, and having an aspect ratio of from 5 to 10) were dispersed and mixed in water, and further a polymer coagulant was added thereto. Using a square sheeting machine for hand sheet making, this was sheeted in wet and dried at 150° C. to obtain an inorganic fiber paper having a basis weight of 41.7 g/m$^2$ and a thickness of 0.21 mm.

Comparative Example 5

As inorganic fibers, 100% by mass of C-glass wool fibers having an average fiber diameter of 0.6 μm (Nippon Sheet Glass' CMLF306) were dispersed and mixed in water. Using a square sheeting machine for hand sheet making, this was sheeted in wet and dried at 150° C. to obtain an inorganic fiber paper having a basis weight of 26.4 g/m$^2$ and a thickness of 0.20 mm.

The inorganic fiber papers of Examples 1 to 4 and Comparative Examples 1 to 5 obtained in the above were assessed for various characteristics thereof according to the methods mentioned below. The results are shown in Table 1.

[Thickness]

Using a dial thickness gauge, each paper was measured under a load of 19.6 kPa applied thereto.

[Basis weight]

The mass (g) of 0.1 m$^2$ of each paper was measured, and this was multiplied 10 times to be the basis weight (g/m$^2$) of the paper.

[Density]

This is a value computed as basis weight (g/m$^2$) thickness (mm)÷1000.

[Room-Temperature Tensile Strength]

Using a constant speed tensile tester, the tensile strength (N/25 mm width) of each paper at room temperature was measured. The condition for the measurement was as follows: The pulling speed was 25 mm/min, and the chuck-to-chuck distance was 100 mm.

[Tensile Strength after heated at 600° C.]

Each paper was heated at 600° C. for 1 hour. Then, using a constant speed tensile tester at room temperature, the tensile strength (N/25 mm width) of the paper was measured. This is the tensile strength after heated. The condition for the measurement of the tensile strength was as follows: The pulling speed was 25 mm/min, and the chuck-to-chuck distance was 100 mm.

[Ignition Weight Loss]

The mass ($W_0$) of each paper before heated and the mass ($W_1$) thereof after heated at 600° C. for 1 hour were measured, and the weight loss (%) by heating was computed according to the following formula:

Weight Loss after heating (%)=($W_0$−$W_1$)/$W_0$×100.

[Heating Test at 300° C.]

Each paper was heated at 300° C. for 1 hour, and checked for the presence or absence of smelling gas and for the color change after heating.

0.6 µm were used, the tensile strength at room temperature and after heated at 600° C. of this inorganic fiber paper increased by from 8 to 10%, even though the added amount of the inorganic binder therein was reduced by 25%.

TABLE 1

| | Item | | Unit | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|---|---|
| Material Formulation | Inorganic Fibers | glass fibers (0.6µ) | % by mass | 80 | 80 | 75 | 80 | 80 | 80 | 80 | 80 | 100 |
| | | glass fibers (1.2µ) | % by mass | — | — | 10 | — | — | — | — | — | — |
| | Inorganic Binder | flaky silica (0.5µ) | % by mass | 20 | — | 15 | 20 | 20 | — | — | — | — |
| | | flaky silica (1.5µ) | % by mass | — | 20 | — | — | — | — | — | — | — |
| | | swelling synthetic fluoromica (5µ) | % by mass | — | — | — | — | — | 20 | — | — | — |
| | | non-swelling synthetic fluoromica (3µ) | % by mass | — | — | — | — | — | — | 20 | — | — |
| | | glass flakes (40µ) | % by mass | — | — | — | — | — | — | — | 20 | — |
| | | silica sol | external % by mass | — | — | — | 2 | — | — | — | — | — |
| | Organic Binder | acrylic resin emulsion | external % by mass | — | — | — | — | 2 | — | — | — | — |
| Characteristics | Thickness | | mm | 0.21 | 0.20 | 0.22 | 0.21 | 0.20 | 0.20 | 0.21 | 0.21 | 0.20 |
| | Basis weight | | g/m² | 29.6 | 27.8 | 35.2 | 30.9 | 29.6 | 35.8 | 41.2 | 41.7 | 26.4 |
| | Density | | g/cm³ | 0.141 | 0.139 | 0.160 | 0.147 | 0.148 | 0.179 | 0.196 | 0.199 | 0.132 |
| | Porosity | | % | 93 | 93 | 92 | 93 | 91 | 92 | 91 | 91 | 94 |
| | Room-temperature Tensile Strength | | N/25 mm width | 7.1 | 3.7 | 7.7 | 9.2 | 10.4 | 1.2 | 1.0 | 0.9 | 1.4 |
| | Tensile Strength after heated at 600° C. | | N/25 mm width | 6.8 | 3.4 | 7.5 | 9.1 | 6.6 | 1.0 | 0.8 | 0.7 | 1.5 |
| | Ignition Weight Loss | | % | 2.0 | 2.1 | 2.1 | 2.1 | 4.2 | 4.1 | 0.4 | 0.4 | 0.5 |
| | Heating Test at 300° C. | Generation of Smelling Gas | — | no | no | no | no | yes | yes but a little | no | no | no |
| | | Color Change after heating | — | no | no | no | no | brown | gray | no | no | no |

Note)
Color change after heating: Before heated, the paper was white.

From Table 1, the following were known:

(1) It was confirmed that, though they are inorganic fiber papers consisting substantially only inorganic materials of inorganic fibers and an inorganic binder and having a low basis weight, the inorganic fiber papers of Examples 1 to 4 of the invention have a tensile strength of not less than 3 N/25 mm width both at room temperature and after heated at 600° C., therefore having a sufficient mechanical strength within a temperature range of from room temperature to 600° C., since fine diameter fibers were used as the inorganic fibers therein and since a flaky inorganic material having a small particle diameter and having excellent self-adhesiveness was used as the inorganic binder.

(2) In particular, the tensile strength at room temperature and after heated at 600° C. of the inorganic fiber paper of Example 1, in which flaky silica having an average particle diameter of 0.5 µm was used as an inorganic binder, was increased by about 2 times, as compared with that of the inorganic fiber paper of Example 2, in which flaky silica having an average particle diameter of 1.5 µm was used as the same. From this, it was known that the tensile strength at room temperature to 600° C. of the inorganic fiber papers is greatly influenced by the particle diameter of the flaky inorganic material used as the binder therein.

(3) In the inorganic fiber paper of Example 3, glass fibers having an average particle diameter of 0.6 µm and glass fibers having an average particle diameter of 1.2 µm, mixed in a ratio of 88:12, were used as inorganic fibers. Accordingly, as compared with the inorganic fiber paper of Example 1 in which only glass fibers having an average fiber diameter of (4) In the heating test at 300° C., the inorganic fiber papers of Examples 1 to 4 gave no smelling gas in the initial stage of the heating, and after heated, their color did not change. This confirms substantial absence (zero content) of an organic material in these papers.

(5) The Ignition weight loss of the inorganic fiber papers of Examples 1 to 4 is from 2.0 to 2.1%. This is higher than the heating weight loss, 0.5%, of the inorganic fiber paper of Comparative Example 5 in which no binder was used at all, and this may be presumed because of the removal of the adsorbed water and the release of the hydroxyl group from the flaky silica used as the binder therein. In case where inorganic fiber papers are used in the field where water is undesired, they are generally heated at 150° C. or higher. When used after heated at 200° C. or higher, the inorganic fiber of the invention has no problem in such applications.

(6) As opposed to the above, the tensile strength at room temperature and after heated at 600° C. of the inorganic fiber papers of Comparative Examples 2 to 4, in which swelling synthetic fluoromica (average particle diameter, 5 µm), non-swelling synthetic fluoromica (average particle diameter, 3 µm) and glass flakes (average particle diameter, 40 µm) were used as an inorganic binder, was lower than that of the inorganic fiber paper of Comparative Example 5 in which a binder was not used at all. The binder added to these is not effective at all, and these could not have a satisfactory mechanical strength within a temperature range of from room temperature to 600° C.

(7) The inorganic fiber paper of Comparative Example 1 additionally contained an organic binder, as added to the formulation of Example 1 in an amount of external 2% by mass. Accordingly, its tensile strength at room temperature and after heated at 600° C. was both good; and in particular, its tensile strength at room temperature increased. However, in the heating test at 300° C., the paper gave a smelling gas in the initial stage of heating, and after heated, it discolored (in brown), and its Ignition weight loss was 4.2% and was high.

(8) In the heating test at 300° C., the inorganic fiber papers of Comparative Examples 3 and 4 gave no smelling gas in the initial stage of heating, and after heated, they did not discolor. Therefore, it may be presumed that the content of an inorganic material in these will be substantially zero. Regarding the Ignition weight loss, since the inorganic binder used did not contain many hydroxyl groups, the weight loss of these papers was 0.4% and was low at the same level as that of the inorganic fiber paper of Comparative Example 5 not containing a binder at all.

(9) In the heating test at 300° C., the inorganic fiber paper of Comparative Example 2 gave some smelling gas in the initial stage of heating and, after heated, it discolored in some degree (in gray), and its Ignition weight loss was 4.1% and was high. This may be because, owing to the intercalation effect of the swelling mica therein, the paper would have adsorbed and caught a large amount of impurities such as inorganic materials during its wet sheet making.

The invention claimed is

1. An inorganic fiber paper characterized in that the inorganic fiber paper is produced from a material comprising 60 to 97% by mass of inorganic fibers having an average fiber diameter of not more than 5 μm and 3 to 40% by mass of an inorganic binder formed mainly of a silica-based flaky inorganic material that has a hydroxyl group content per specific surface area of not less than 20 μmol/m$^2$ as measured by a BET method, an average particle diameter of which is not more than 2 μm as measured by a laser scattering method and an aspect ratio of which is not less than 10, the inorganic fibers are bound to each other with the inorganic binder and the inorganic fiber paper consists substantially of only inorganic materials and has a basis weight of less than 100 g/m$^2$.

2. The inorganic fiber paper as claimed in claim 1, which is produced from a material comprising 75 to 97% by mass of the inorganic fibers and 3 to 25% by mass of the inorganic binder formed mainly of the silica-based flaky inorganic material.

3. The inorganic fiber paper as claimed in claim 1, wherein the inorganic fibers have an average fiber diameter of not more than 1.5 μm.

4. The inorganic fiber paper as claimed in claim 1, wherein the silica-based flaky inorganic material is flaky silica.

5. The inorganic fiber paper as claimed in claim 1, which has a basis weight of not more than 60 g/m$^2$.

6. A separator for electric energy storage devices characterized by comprising of the inorganic fiber paper of claim 1.

7. An electric energy storage device characterized by comprising the separator for electric energy storage devices of claim 6.

8. A separator for electric double layer capacitors characterized by comprising of the inorganic fiber paper of claim 1.

9. An electric double layer capacitor characterized by comprising the separator for electric double layer capacitors of claim 8.

* * * * *